Oct. 24, 1961     K. A. LANG     3,005,858
MULTIPLE CHAMBER METAL MELTING FURNACE
Filed April 8, 1959
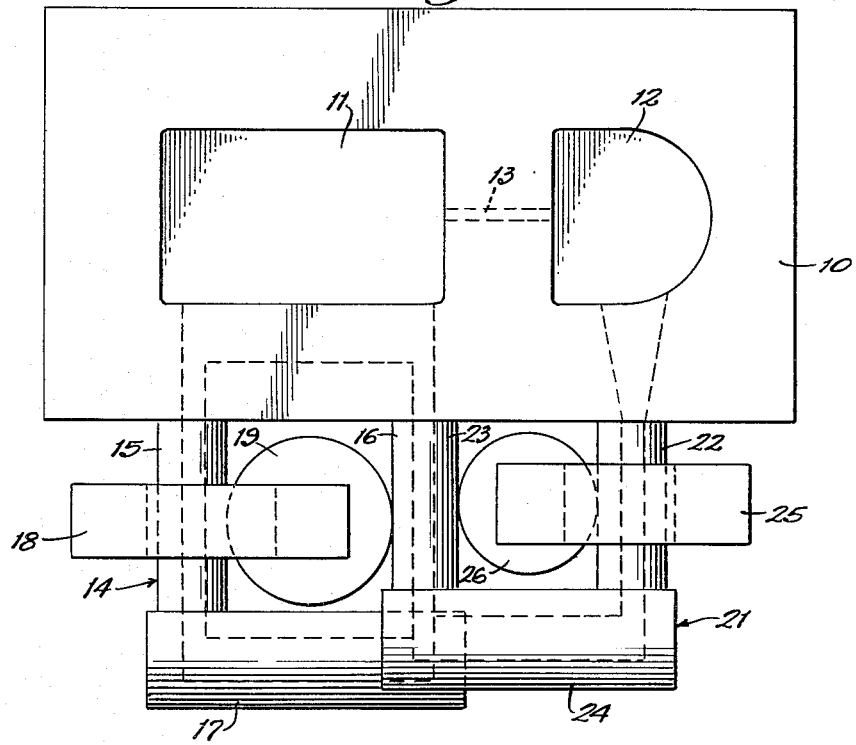
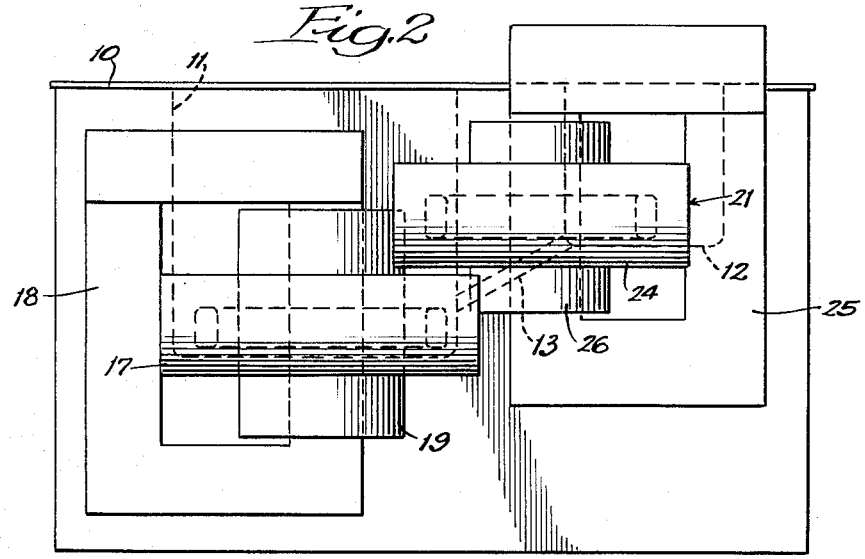
INVENTOR:
Karl A. Lang,
BY
Bair Freeman & Molinare
ATTORNEYS.

United States Patent Office 3,005,858
Patented Oct. 24, 1961

3,005,858
MULTIPLE CHAMBER METAL MELTING FURNACE
Karl A. Lang, Downey, Calif., assignor to Lindberg Engineering Company, Chicago, Ill., a corporation of Illinois
Filed Apr. 8, 1959, Ser. No. 805,094
2 Claims. (Cl. 13—29)

This invention relates to multiple chamber metal melting furnaces and more particularly to an induction type furnace for melting various types of metals including the light metals.

In induction metal melting furnaces, it has been the custom to provide a secondary loop containing molten metal and connected at its ends to a hearth and which is threaded by a primary winding. In single chamber furnaces, there is a single chamber, or hearth, to which one or more secondary loops may be connected so there is only one mass of molten metal and one heating rate only can be applied. In two-chamber furnaces, as customarily constructed, there are two spaced chambers or hearths connected by submerged channels which are threaded by primary windings. While the heating rate to the different chambers can be varied to some degree by design, the amount of variation which can be achieved is very limited and is fixed by design.

In melting and particularly in relatively high rate melting, cold metal charged into the charging chamber reduces the temperature therein while the metal in the pouring chamber is not similarly chilled. Therefore if the heat input is sufficient to melt metal in the charging chamber, the metal in the pouring chamber tends to become overheated. It is therefore desirable to heat the charging chamber at a substantially higher rate than the pouring chamber and to be able to adjust the rate difference so that the cold metal may be melted rapidly and the molten metal in the pouring chamber will not be overheated under different operating conditions.

Another disadvantage encountered with two chamber furnaces as conventionally constructed is that the submerged channels threaded by primary windings are subject to pinch effect and tend to clog rapidly. Pinch effect, as is well understood in the art, results in collection of slag and impurities adjacent to the electrical center of those portions of the channels which are cut by the alternating flux produced by the primary windings. In a conventional two-chamber furnace clogging of the submerged channels connecting the chambers requires that the whole furnace be torn down and rebuilt. Further the channels must be long enough to provide space for mounting of the primary windings between the chambers, thereby requiring a furnace which is very long and space consuming.

It is one of the objects of the present invention to provide a multiple chamber metal melting furnace in which the heating rates in the different chambers can be varied as desired relative to each other.

Another object is to provide a furnace in which the metal in the different chambers is heated by effectively separated secondary loops without substantially increasing the size of the furnace.

According to a feature of the invention the charging chamber is heated by an individual secondary loop connected to the charging chamber only and the pouring chamber is heated by a secondary loop spanning both the charging and pouring chambers.

A further object is to provide a furnace in which the chambers are connected by a submerged passage spaced from and magnetically decoupled from the primary windings so that it is not subject to pinch effect and will have minimum tendency to clog.

According to another feature of the invention, the secondary loops which are threaded by the primaries are external to the main furnace body so that in the event of clogging due to pinch effect the secondary loop structures can be replaced without requiring that the furnace be completely torn down.

The above and other objects and features of the invention will be more readily apparent from the following description when read in connection with the accompanying drawing, in which:

FIGURE 1 is a top plan view of a metal melting furnace embodying the invention; and
FIGURE 2 is a side elevation.

The furnace, as shown, comprises a main body 10 which may be formed of ceramic or refractory material to withstand the heat of the molten metal without damage and which is electrically non-conducting. The body is formed with a melting chamber, or hearth, 11 which may be relatively large and with a pouring or ladling chamber, or hearth, 12 spaced horizontally from the chamber 11 and preferably smaller than the chamber 11. The two chambers are both adapted to contain molten metal and may be connected by a channel 13 formed in the body 10 and lying below the normal level of molten metal in the chambers through which metal can flow from one chamber to the other.

The furnace body can be made quite short with the hearths 11 and 12 much closer together than in conventional two-chamber furnaces, since no space need be provided between them for the usual primary winding structures. The channel 13 may be correspondingly short and may be of any desired size. However, it may be made of relatively small cross section, as shown, just sufficient to pass molten metal at the required rate for the furnace capacity, since it is not subjected to pinch effect and has no tendency to clog.

Metal in the charging chamber 11 is heated by a secondary loop, indicated generally at 14, and which may be formed by a pair of substantially parallel legs 15 and 16 formed with openings therethrough communicating with the hearth 11 below the normal metal level therein and connected by a cross leg 17 formed with an opening therethrough communicating with the openings through the legs 15 and 16. The legs 15 and 16 may be formed for detachable connection to the furnace body for easy replacement. With this construction, a U-shaped body of metal will lie within the secondary loop with the ends of the loop in free communication with the molten metal in the charging chamber 11. A primary core 18 threads the secondary loop, as shown, and carries a primary winding 19 adapted to be supplied with alternating current to produce a flow of secondary heating current through the metal in the loop.

In order to supply heat to the molten metal in the pouring chamber 12 a similar loop, indicated generally at 21, is provided having parallel legs 22 and 23 communicating respectively with the pouring chamber 12 and the charging chamber 11 below the normal metal level therein and connected by a cross leg 24. The secondary loop 21 is threaded by a primary magnetic core 25 which carries a primary winding 26 lying within the loop, as shown.

In operation, when the winding 19 is energized, secondary heating current will be induced in the metal within the secondary loop 14 and the melting or charging chamber 11 to supply heat to the metal in the chamber and melt the metal. When the primary winding 26 is energized, a flow of secondary heating current will be induced from the molten metal in the charging chamber 11 through the secondary loop, the molten metal in the pouring chamber 12, and the channel 13 back to the charging chamber.

The channel 13, as is apparent from FIGURE 1, is spaced an appreciable distance from the primary windings 19 and 26 and may be shielded therefrom by a metal casing over the furnace. Therefore, this channel is not cut by flux produced by the coils and is free from pinch effect. It has been found from actual operation of furnaces constructed in accordance with the present invention that even though the external secondary loops 14 and 21 may clog due to pinch effect, there is no tendency for the channel 13 to clog.

It will be noted that this construction lends itself to an extremely compact structure with the secondary loops partially overlapping each other, as best seen in FIGURE 2, so that the length of the furnace is not increased over that of a conventional furnace. In fact, the furnace may be shortened since the channel 13 may be made quite short. At the same time, the quantity of heat supplied to the charging and pouring chambers respectively can be accurately controlled and adjusted by controlling the current input to the windings 19 and 26, respectively. All of the energy supplied to the winding 19 will be in turn supplied to the charging chamber 11, while the energy supplied to the winding 26 will be in turn supplied in part to the pouring chamber and in part to the charging chamber. Since the demand for heat in the charging chamber is substantially greater than the demand of the pouring chamber, the furnace can thus be kept in correct heat balance to melt the metal rapidly without any possibility of overheating.

This application is a continuation-in-part of my co-pending application Serial No. 480,755, filed January 10, 1955 and now abandoned.

While one embodiment of the invention has been shown and described herein, it will be understood that it is illustrative only and not to be taken as a definition of the scope of the invention, reference being had for this purpose to the appended claims.

What is claimed is:

1. A multiple chamber metal melting furnace consisting essentially of a furnace body formed of non-conducting refractory material with a pair of horizontally spaced chambers in side-by-side closely adjacent relationship, a channel formed in the body connecting the chambers and lying below the normal level of molten metal therein, the channel being wholly within the furnace body, a refractory structure secured to the furnace body externally thereof and formed with a U-shaped secondary loop passage communicating at its ends with spaced points in one only of the chambers below the normal level of molten metal therein to be filled with molten metal, a primary winding lying wholly outside of the furnace body and inductively coupled to the molten metal in the loop passage to induce heating current therein, a second refractory structure secured to the furnace body externally thereof and defining a second U-shaped secondary loop passage communicating at one end with one of the chambers and at its other end with the other of the chambers below the normal level of molten metal therein to be filled with molten metal, and a second primary winding lying wholly outside of the furnace body and inductively coupled to the molten metal in the last named secondary loop to induce heating current therein, said two primary windings comprising the entire source of power for the furnace said channel being spaced sufficiently from the primary windings to be effectively decoupled therefrom.

2. A multiple chamber metal melting furnace consisting essentially of a furnace body formed of non-conducting refractory material with a pair of horizontally spaced chambers in side-by-side closely adjacent relationship, a channel formed in the body connecting the chambers and lying below the normal level of molten metal therein, the channel being wholly within the furnace body, refractory means secured to the furnace body externally thereof and defining two U-shaped secondary loops communicating with the chambers below the normal level of molten metal therein to be filled with molten metal therefrom, one of the secondary loops having both ends communicating with spaced points in one only of the chambers and the other secondary loop having one end communicating with one of the chambers and its other end communicating with the other of the chambers, and a pair of primary windings lying wholly outside of the furnace body and inductively coupled with the secondary loops respectively, said two primary windings comprising the entire source of power for the furnace said channel being spaced sufficiently from the primary windings to be effectively decoupled therefrom.

References Cited in the file of this patent

UNITED STATES PATENTS

| | | |
|---|---|---|
| 761,920 | Schneider | June 7, 1904 |
| 2,427,817 | Tama | Sept. 23, 1947 |
| 2,499,540 | Tama | Mar. 7, 1950 |
| 2,520,349 | Tama | Aug. 29, 1950 |